May 28, 1935. O. ZANCAN 2,003,166
FRONT DRIVE FOR MOTOR CARS
Filed Oct. 26, 1933 3 Sheets-Sheet 1

INVENTOR
Ottavio Zancan
BY
ATTORNEY

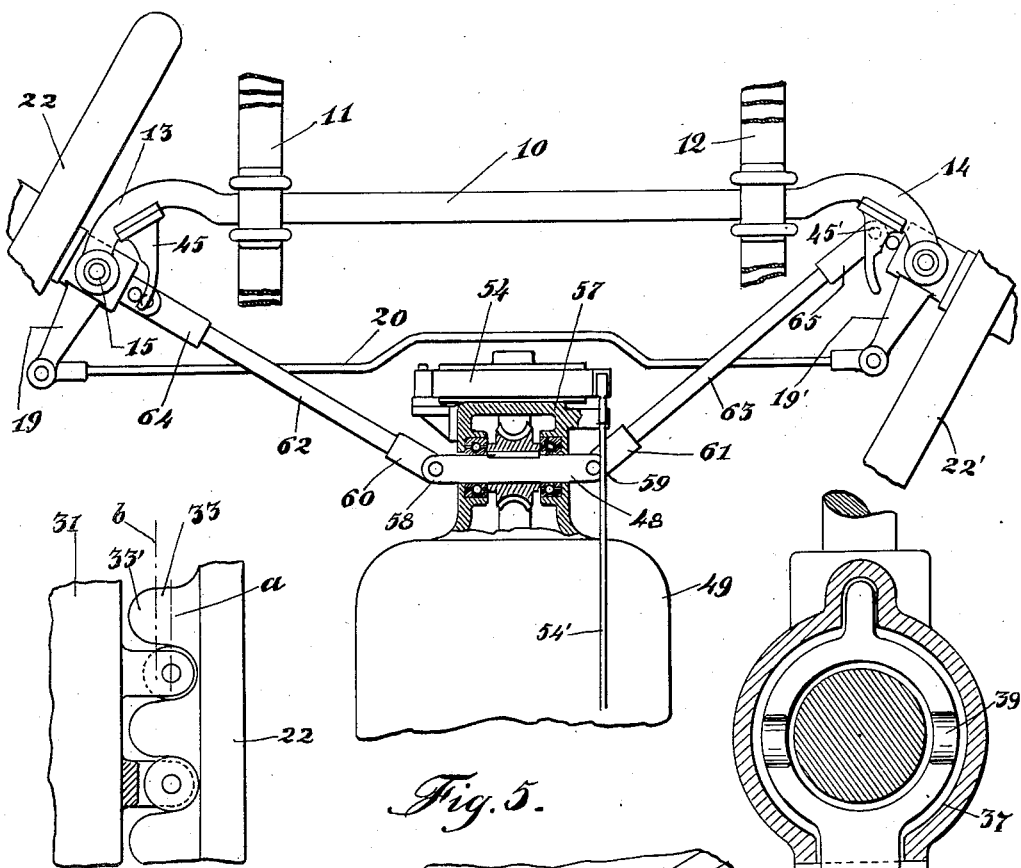
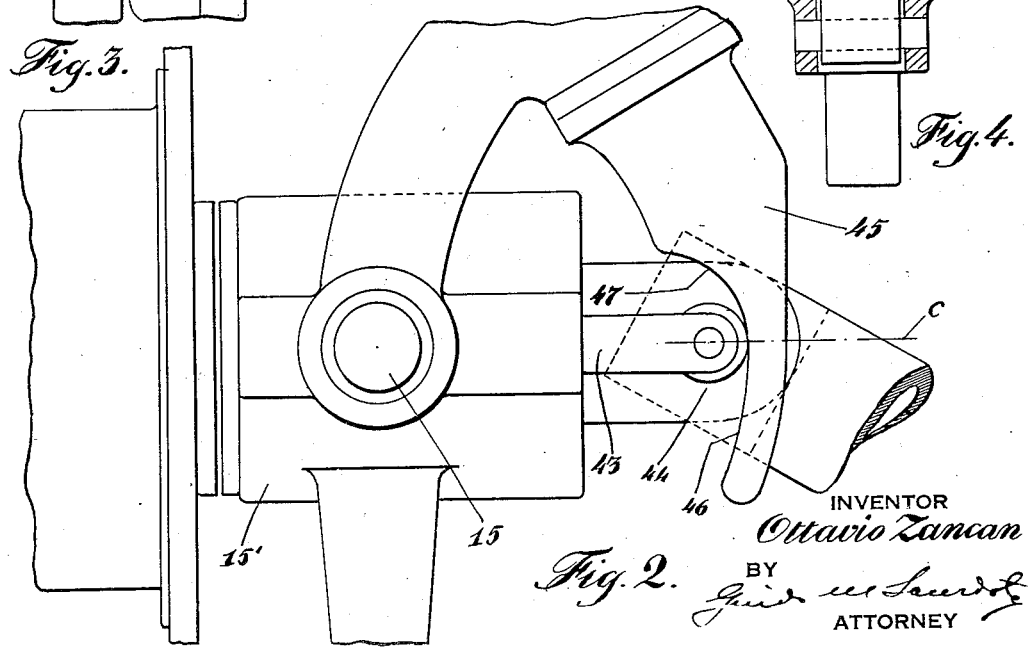

May 28, 1935. O. ZANCAN 2,003,166
FRONT DRIVE FOR MOTOR CARS
Filed Oct. 26, 1933 3 Sheets-Sheet 3
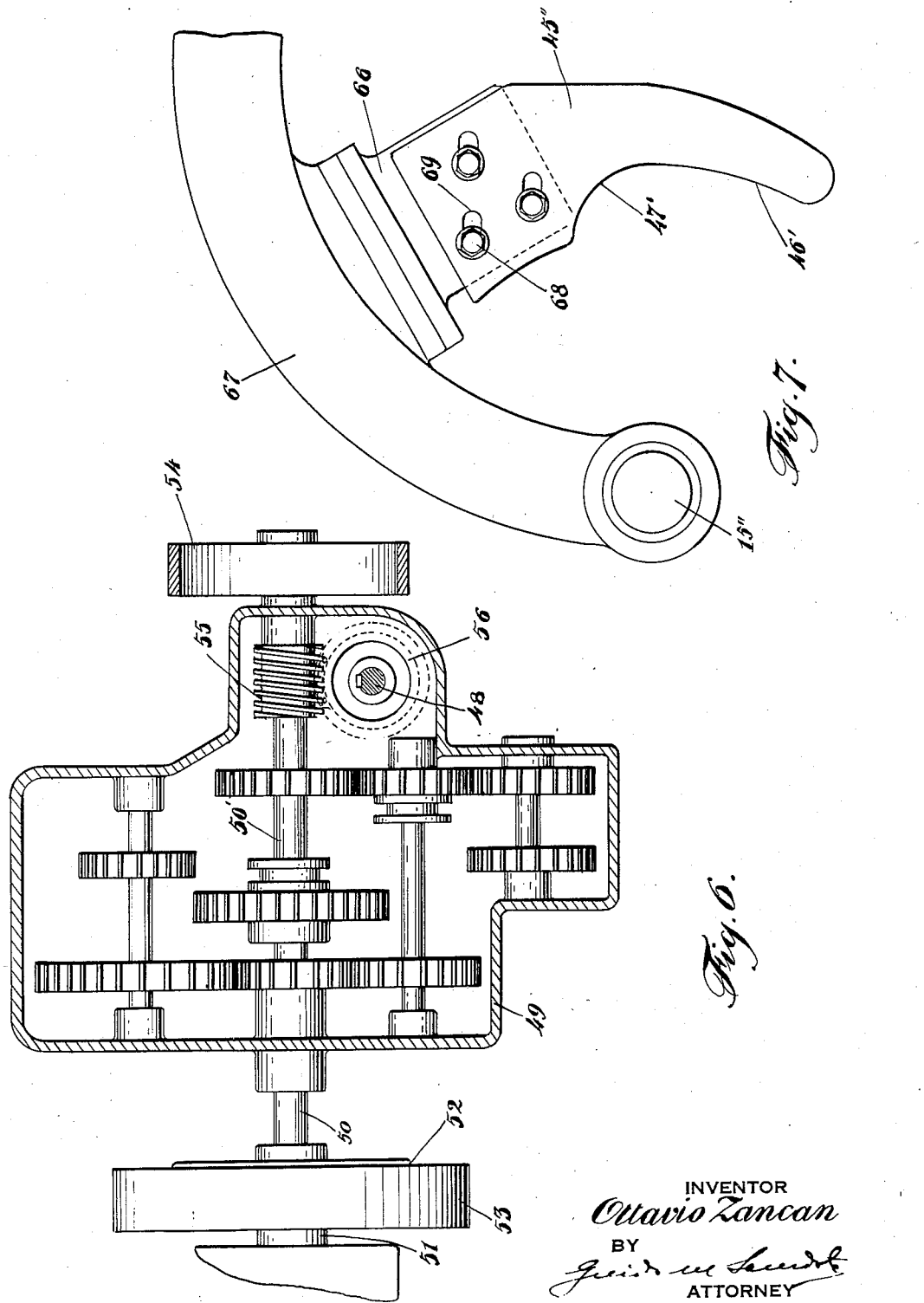
INVENTOR
Ottavio Zancan
BY
ATTORNEY Patented May 28, 1935

2,003,166

UNITED STATES PATENT OFFICE 2,003,166

FRONT DRIVE FOR MOTOR CARS

Ottavio Zancan, New York, N. Y.

Application October 26, 1933, Serial No. 695,338

4 Claims. (Cl. 180—18)

This invention relates to motor car driving mechanism and more particularly refers to improvements in front drives of the type where the use of a differential gearing is dispensed with in favor of individual clutch connections between the front wheels and the driving shafts therefor.

The primary object of this invention is to provide a novel and improved driving arrangement for motor vehicles, especially designed for front driving, whereby the driving mechanism proper is mounted independently of the front axle and is directly connected to the front wheels so as to, as far as possible, relieve the front axle of all unsprung weight.

Another object of this invention is to provide in a driving mechanism of the type where wheels mounted at opposite sides of the chassis may be connected to or disconnected from their respective driving shafts independently of each other, means cooperating with said wheels, adapted to automatically cause one or the other of said wheels to become disengaged from its driving shaft when the car is turned to one side or the other.

A further object is to provide, in a driving mechanism of the character specified, where one or the other of the front wheels of a motor car is caused to become automatically disconnected from its respective driving shaft, when the car is being turned to one side or the other, a slipping clutch connection between each wheel and its respective driving shaft, facilitating the operation of the clutch mechanism itself.

A still further object is to provide in a front driving mechanism for motor cars, a novel and improved arrangement of individually actuated driving shafts for the front wheels thereof, whereby a relatively high driving efficiency for one or the other of said shafts is obtained when, in turning, its corresponding wheel becomes the outer or driving wheel, while the other or inner wheel becomes disconnected from its respective shaft.

Other objects and advantages of the present invention will more fully appear as the description proceeds and will be set forth and claimed in the appended claims.

In the development of my present invention I have sought to simplify as much as possible the construction of the front axle proper and to reduce to a minimum the weight of the parts actually supported thereby, in order to shift said weight to other parts of the chassis supported by springs.

I have furthermore sought to simplify as much as possible the general arrangement of a front drive for motor cars, not only in order to reduce its cost of production, but also in order to improve its general efficiency and performance.

My invention is illustrated by way of example in the accompanying drawings, in which:

Fig. 2 is a fragmentary plan view of the cam arrangement controlling the operation of the clutch;

Fig. 3 is a fragmentary plan view of part of the crown of the two clutch elements, composing the clutch shown in Fig. 1;

Fig. 4 is a detail vertical cross section through line 4—4 of Fig. 1;

Fig. 5 is a fragmentary plan view of the front part of a motor car chassis, embodying my invention;

Fig. 6 is a view in elevation, partly sectioned, of the transmission mechanism; and Fig. 7 is a fragmentary plan view, illustrating an alternative way of mounting the clutch controlling cam.

Figure 1:
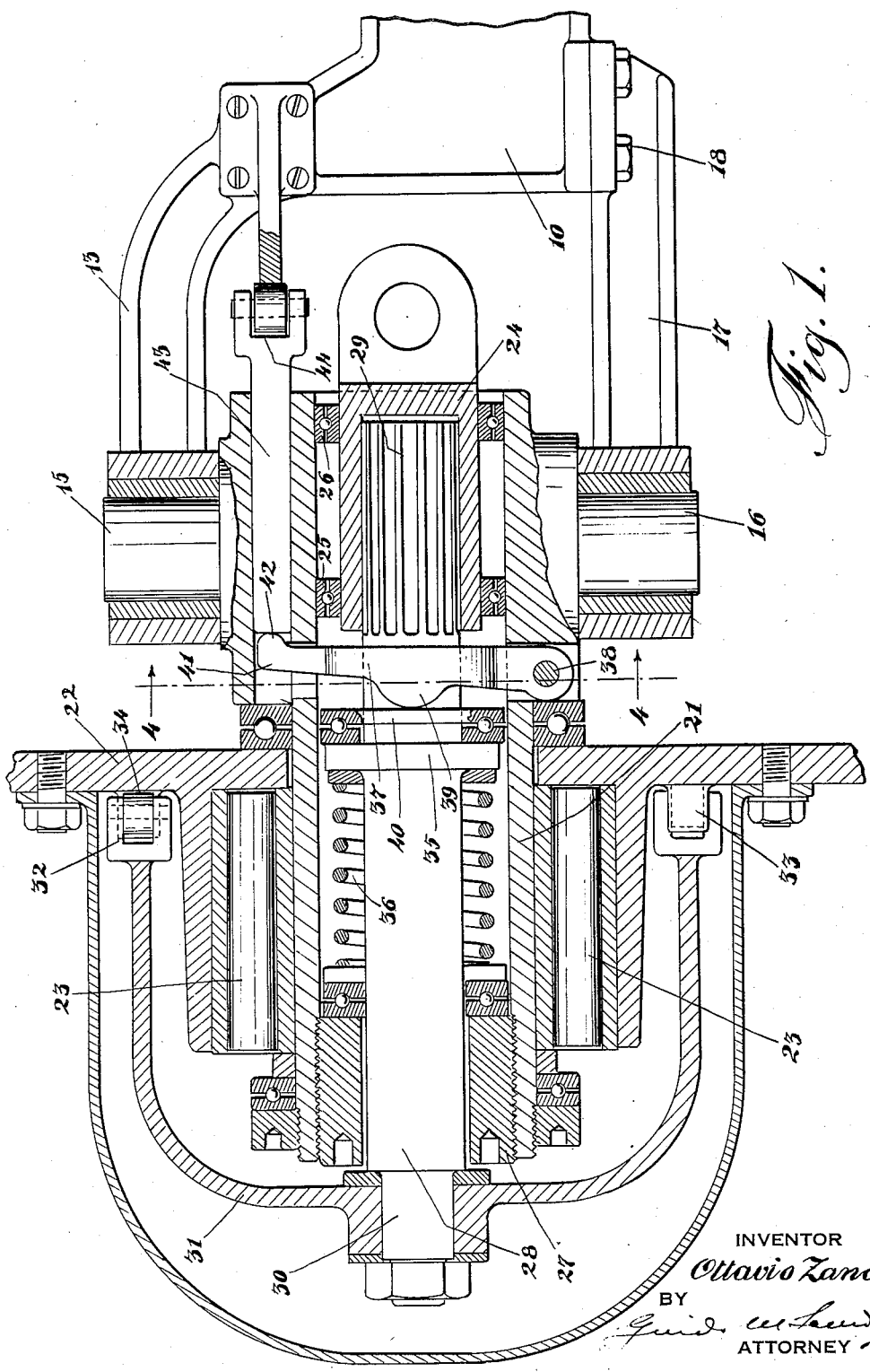
Fig. 1 is a detail vertical section of the arrangement for connecting one of the front wheels to and disconnecting it from its respective shaft.

Referring to Figs. 1 to 6, 10 designates the front axle of a motor car, on which are fixed the two springs 11, 12, said axle being formed with two inwardly directed steering knuckle carrying ends 13, 14.

Each steering knuckle is provided, as usual, with an upper vertical pivotal stud 15, rotatably mounted within the corresponding end 13 or 14 of the front axle, and a lower pivotal stud 16, similarly mounted in an extension 17 vertically spaced from the axle end 13 or 14, said extension being bolted or otherwise secured onto the lower surface of the axle, as shown at 18.

Studs 15, 16 together form a pivotal support for the steering knuckle, which comprises, as usual, a steering arm 19 connected by a connecting rod 20 to the steering arm 19' of the steering knuckle at the opposite end.

Each steering knuckle is also formed integral with an outwardly extending hollow shaft 21, upon which is mounted the wheel 22 through the intermediary of roller bearings 23.

Within the inner end of hollow shaft 21, is rotatably mounted a universal joint socket 24, supported by ball bearings 25, 26, and the outer end of said shaft is internally threaded to receive a threaded plug 27, forming a bearing for the outer end of a short shaft 28, which constitutes the driving shaft proper for the wheel.

Said driving shaft 28 is spliced at the rear end, as shown at 29, so as to form a slidable driving connection with socket 24, within which it is inserted. The outer end of said shaft is turned down to form an outwardly extending stud 30, on which is secured clutch member 31, adapted to engage the wheel at 32.

For this purpose the wheel is provided or formed integral with a stationary clutch member, comprising a circumferential series of teeth 33, as shown in Fig. 3, said teeth being preferably rounded, as shown, in order to form with the clutch member 31 a slipping clutch connection. In order to decrease friction when the clutch is being engaged or disengaged, one of the clutch members, for instance, clutch member 31, has its clutch elements constituted by rollers 34, adapted to enter the space intervening between teeth 33 of the other clutch member.

When the clutch is in full engagement, as shown in Figs. 1 and 3, the plane a passing through the axes of rollers 34 remains somewhat beyond the plane b passing through the centers of the rounded portions 33' of teeth 33, so that a positive non-slipping connection is, therefore, established between the two clutch members.

When clutch member 31 is forced outwardly to a point where plane a has passed to the left of plane b, with respect to Fig. 3, the connection between the two clutch members becomes of the slipping type, and the continued rotation of one clutch member with respect to the other will facilitate their disengagement, as clutch member 31 continues to be forced outwardly in the manner which will be later explained.

Driving shaft 28 is formed with a collar 35, forming an abutment for a light spring 36, interposed between said collar and plug 27, the action of said spring being normally to hold clutch 31 into engagement with its respective wheel. As explained, shaft 28 is axially shiftable with respect to socket 24 and the same can be forced outwardly by means of a forked lever 37, pivotally mounted at 38, said forked lever having two projecting lugs 39, one at each side of shaft 28, bearing against collar 35 through the intermediary of a ball bearing 40.

The outer end 41 of lever 37 is formed with a rounded lug 42, against which bears a rod 43, longitudinally shiftable within the steering knuckle. The outer end of said rod 43 extends inwardly of the steering knuckle and carries a roller 44, which normally bears against a cam member 45, attached to and extending from axle 10.

Referring to Fig. 2, it will be seen that the portion 46 of the cam surface, extending rearwardly of the plane c passing through the axis of the pivotal connections of both steering knuckles, is concentric with the pivotal connection of the corresponding knuckle, whereas the portion 47 of said cam surface, extending frontwardly of said plane c has a much smaller radius than part 46.

It will be seen that by virtue of this arrangement, if steering knuckle 15', which is the left hand steering knuckle, is angularly displaced in a clockwise direction, as shown in Fig. 5, the position of roller 44 and rod 43 will remain undisturbed and so will the clutch connection between the driving shaft 28 and its respective wheel 22. If on the other hand, the steering knuckle is angularly displaced in a counterclockwise direction, portion 47 of the cam surface will force roller 44 inwardly, causing the clutch connection to become disengaged.

As explained, when this is done it is sufficient for the clutch member 31 to be moved to a point where plane a, passing through the axis of rollers 34, has passed beyond plane b of Fig. 3. At this stage, the pressure mutually exerted by clutch members against each other will assist the action of the cam surface 47 in causing the clutch members to become disengaged.

Referring to Fig. 5, it will be observed that when the steering knuckle at the left is angularly displaced in a clockwise direction, connecting rod 20 will cause a corresponding displacement of the steering knuckle at the right, with the result that a right turn will be taken. Wheel 22 at the left will become the outer wheel and wheel 22' at the right will become the inner wheel, and due to the position of said inner wheel with respect to cam 45' at the right, it will be seen that while the clutch connection of outer wheel 22 is left undisturbed, inner wheel 22' will become disconnected, the operation of its clutch taking place automatically upon the steering knuckle carrying said wheel being turned in the manner described.

The reverse will take place if the steering knuckles are angularly displaced in the opposite direction, when a left turn will be taken and wheel 22 will become the inner wheel, while wheel 22' will become the outer wheel.

In Fig. 5 it is also seen that each steering knuckle is directly connected by means of an articulated shaft to the power take-off shaft 48, mounted at the forward end of gear box 49. Said gear box, as shown in Fig. 6, is placed in front of the motor, with its shafts 50, 50' coaxial with the motor shaft 51, clutch members 52, 53 being respectively mounted on said shafts 50, 51, and a brake 54, being mounted at the outer end of shaft 50' and being actuated by brake rod 54'.

Said gear box contains the speed change gears, which may be arranged in any suitable manner, and also contains a worm 55, mounted at the forward end of shaft 50 and a work wheel 56 driven thereby fixed on shaft 48. Said shaft 48 projects at each side of the forward end 57 of the gear box, and each one of its ends 58—59 is connected to a universal joint 60, 61 to a shaft 62, 63, said shafts 62, 63 being, in their turn, connected by universal joints 64, 65 to the respective joint sockets 24, such as shown in Fig. 1, a similar joint socket being provided, but not shown, for wheel 22'.

By virtue of this arrangement, the front axle is entirely relieved of the weight of parts associated with the driving mechanism and a lighter and preferable construction results. Another advantage resulting from this arrangement is that the articulated shaft extending between power take-off shaft 48 and the outer wheel when the car is taking a turn will operate under very favorable conditions, because the turning of the wheels tends to reduce to a minimum the angle between the various members comprising the articulated shaft. On the other hand, the other articulated shaft is working under unfavorable conditions, because the angle between the elements composing the universal joint at the steering end will be increased. However, the corresponding wheel being the inner wheel, said articulated shaft will have practically no work to do so that no harm results from the conditions described.

At times it may be desirable to make the cams 45, 45' adjustable to and from their respective wheels. In such cases, the construction shown in Fig. 7 may be adopted. In the same it will be seen that cam 45' proper is secured onto a support 66, which is, in its turn secured onto end 67 of the front axle, by means of screws 68, which are inserted in slots 69, provided in the attaching portion of the cam. Said slots extend in a direction parallel to plane c', connecting the pivotal steering knuckle supports, so that the cam surface 46'—47' can be adjusted to and from the pivotal support 15, 15'', of the corresponding steering knuckle.

It will be observed that the arrangement described makes it possible to substitute for the differential gearing ordinarily used for actuating the two driving wheels of a motor car, a simpler driving mechanism in the form of a worm gearing. This also makes it possible to do away with the wheel brakes, the braking action being efficiently performed by the brake mounted on the transmission shaft. It will also be observed that since the operation of the wheel clutches takes place automatically upon the wheels being turned to one side or the other, the construction of the steering apparatus is much simpler than that described in my copending application, above referred to. The two articulated shafts extending from the worm wheel shaft to the wheel driving shafts permit full and free sway to the chassis and parts carried thereby in their vertical displacements caused by oscillations of their supporting springs with respect to the front axle.

The constructional details of my device may vary from those shown without departure from the inventive idea; the drawings, therefore, will be understood as being intended for illustrative purposes only and not in a limiting sense. I accordingly reserve the right to carry my invention into practice in all those ways and manners which may enter, fairly, into the scope of the appended claims.

I claim:

1. In a motor car the combination, with a front axle, a steering knuckle comprising a wheel support pivotally mounted at each end of said axle, a wheel rotatably mounted upon each support, and a driving shaft for each wheel rotatably mounted within its respective support, of a clutch member carried by each wheel, another clutch member carried by its respective driving shaft, adapted to engage said wheel clutch member, one of said clutch members comprising a circumferential series of rollers positively connected to and actuated by said driving shaft, the other clutch member having a circumferential series of recesses adapted to register with said rollers, the depth of said recesses being at least equivalent to the radius of said rollers, so as to form a positive driving connection therewith, and means for automatically causing said shaft clutch member to move away from said wheel clutch member, when its steering knuckle is angularly displaced so as to cause the car to turn to the corresponding side thereof, so as to intitate the disconnection of one clutch member from the other.

2. In a motor car the combination, with a front axle, a steering knuckle comprising a wheel support pivotally mounted at each end of said axle, a wheel rotatably mounted upon each support, and a driving shaft for each wheel rotatably mounted within its respective support, of a clutch member carried by each wheel, another clutch member carried by its respective driving shaft, adapted to engage said wheel clutch member, one of said clutch members comprising circumferential series of rollers positively connected to and actuated by said driving shaft, the other clutch member having a circumferential series of recesses adapted to register with said rollers, the depth of said recesses being at least equivalent to the radius of said rollers, so as to form a positive driving connection therewith, and a stationary cam member, carried by said axle at each end thereof, automatically causing shifting of the corresponding driving shaft to move the clutch member carried thereby away from the corresponding wheel, when the steering knuckle carrying said wheel is angularly displaced so as to cause the car to turn to the corresponding side thereof, so as to initiate the disconnection of one clutch member from the other.

3. In a motor car the combination, with a front axle, a steering knuckle comprising a wheel support pivotally mounted at each end of said axle, a wheel rotatably mounted upon each support, and a driving shaft for each wheel rotatably mounted within its respective support, of a clutch member carried by each wheel, another clutch member carried by its respective driving shaft, adapted to engage said wheel clutch member, one of said clutch members comprising a circumferential series of rollers, the other clutch member having a circumferential series of recesses adapted to register with said rollers, the depth of said recesses being at least equivalent to the radius of said rollers, so as to form a positive driving connection therewith, a stationary cam member, carried by said axle at each end thereof, automatically causing shifting of the corresponding driving shaft to move the clutch member carried thereby away from the corresponding wheel, when the steering knuckle carrying said wheel is angularly displaced so as to cause the car to turn to the corresponding side thereof, so as to initiate the disconnection of one clutch member from the other, a power take-off shaft mounted at the rear of and independently of said axle, and an articulated connection between each end of said power take-off shaft and the wheel driving shaft at the corresponding side.

4. In a motor car the combination, with a front axle, a steering knuckle comprising a wheel support pivotally mounted at each end of said axle, a wheel rotatably mounted upon each support, and a driving shaft for each wheel rotatably mounted within its respective support, of a clutch member carried by each wheel, another clutch member carried by its respective driving shaft, adapted to engage said wheel clutch member, one of said clutch members comprising a circumferential series of rollers, the other clutch member having a circumferential series of recesses adapted to register with said rollers, the depth of said recesses being at least equivalent to the radius of said rollers, so as to form a positive driving connection therewith, a stationary cam member carried by said axle at each end thereof, automatically causing shifting of the corresponding driving shaft to move the clutch member carried thereby away from the corresponding wheel, when the steering knuckle carrying said wheel is angularly displaced so as to cause the car to turn to the corresponding side thereof, so as to initiate the disconnection of one clutch member from the other, a worm gearing comprising a power take-off shaft mounted at the rear of and independently of said axle, and an articulated connection between each end of said power take-off shaft and the wheel driving shaft at the corresponding side.

OTTAVIO ZANCAN.